(12) United States Patent
Wang et al.

(10) Patent No.: US 11,808,475 B2
(45) Date of Patent: Nov. 7, 2023

(54) AIR CONDITIONER AND ELECTRICAL HEATING CONTROL METHOD THEREFOR AND CONTROL DEVICE THEREOF

(71) Applicants: QINGDAO HAIER AIR CONDITIONER GENERAL CORP., LTD., Qingdao (CN); HAIER SMART HOME CO., LTD., Qingdao (CN)

(72) Inventors: Fengchun Wang, Qingdao (CN); Limin Sun, Qingdao (CN); Sue Liu, Qingdao (CN)

(73) Assignees: QINGDAO HAIER AIR CONDITIONER GENERAL CORP., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 71 days.

(21) Appl. No.: 17/442,570

(22) PCT Filed: Sep. 19, 2019

(86) PCT No.: PCT/CN2019/106570
§ 371 (c)(1),
(2) Date: Sep. 23, 2021

(87) PCT Pub. No.: WO2020/192044
PCT Pub. Date: Oct. 1, 2020

(65) Prior Publication Data
US 2022/0349610 A1    Nov. 3, 2022

(30) Foreign Application Priority Data

Mar. 26, 2019    (CN) .......................... 201910233189.1

(51) Int. Cl.
*F24F 11/65*    (2018.01)
*F24F 11/64*    (2018.01)
*F24F 1/0093*    (2019.01)

(52) U.S. Cl.
CPC ............ *F24F 11/65* (2018.01); *F24F 1/0093* (2019.02); *F24F 11/64* (2018.01)

(58) Field of Classification Search
CPC .. F24F 11/77; F24F 11/30; F24F 11/38; F24F 11/46; F24F 11/65; H05K 1/0203; H05K 7/20836; H05K 7/20209
See application file for complete search history.

(56) References Cited

U.S. PATENT DOCUMENTS

| 5,131,455 A | 7/1992 | Tsuchiyama et al. |
| 6,876,164 B2 * | 4/2005 | Liu ........................ F04D 25/166 318/434 |

(Continued)

FOREIGN PATENT DOCUMENTS

| CN | 2769724 Y | 4/2006 |
| CN | 2769726 Y | 4/2006 |

(Continued)

*Primary Examiner* — Darrin D Dunn
(74) *Attorney, Agent, or Firm* — Jiwen Chen; Joywin IP Law PLLC

(57) ABSTRACT

The invention discloses an air conditioner and an electric heating control method and a control device thereof. An electric heating module and an indoor fan are arranged in an indoor unit of the air conditioner, the electric heating module comprises an electric heating unit and an electric heating control circuit, and an auxiliary fan is further arranged in the indoor unit; the electric heating control method comprises the following steps that when an electric heating starting condition is met, and the electric heating unit and the auxiliary fan are operated; after the auxiliary fan operates, heat generated by the electric heating unit is blown out from an air outlet of the indoor unit. According to the electric heating control method, the normal start of electric heating can be ensured to the maximum degree, and the requirement for auxiliary heating by electric heating is met.

3 Claims, 4 Drawing Sheets

(56) References Cited

U.S. PATENT DOCUMENTS

| | | | | |
|---|---|---|---|---|
| 10,912,234 | B2* | 2/2021 | Baran | H05K 7/20172 |
| 2005/0007041 | A1* | 1/2005 | Liu | F04D 25/166 |
| | | | | 318/77 |
| 2008/0083834 | A1* | 4/2008 | Krebs | F24F 11/65 |
| | | | | 237/2 A |
| 2010/0070085 | A1* | 3/2010 | Harrod | F24F 11/30 |
| | | | | 700/282 |
| 2019/0141859 | A1* | 5/2019 | LeFebvre | H05K 7/20827 |
| 2020/0240672 | A1* | 7/2020 | Patil | F24F 11/81 |
| 2022/0026099 | A1* | 1/2022 | Patil | F24F 11/77 |

FOREIGN PATENT DOCUMENTS

| | | |
|---|---|---|
| CN | 2878997 Y | 3/2007 |
| CN | 2906406 Y | 5/2007 |
| CN | 102252367 A | 11/2011 |
| CN | 108278763 A | 7/2018 |
| JP | 2015200456 A | 11/2015 |

\* cited by examiner

AIR CONDITIONER AND ELECTRICAL HEATING CONTROL METHOD THEREFOR AND CONTROL DEVICE THEREOF

This is a U.S. national stage application of PCT Application No. PCT/CN2019/106570 under 35 U.S.C. 371, filed Sep. 19, 2019 in Chinese, claiming priority to Chinese Patent Application No. 201910233189.1, filed Mar. 26, 2019, all of which are hereby incorporated by reference.

TECHNICAL FIELD

The invention belongs to the technical field of air conditioning, and specifically relates to an air conditioner, a control method of an electric heating module provided in the air conditioner and a control device.

BACKGROUND TECHNOLOGY

An electric heating module is typically installed in an indoor unit of an air conditioner in the prior art, which is configured to serve as a secondary source of extra heating. The working temperature of electric heating module is considered high that may result in a situation that the temperature inside the air conditioner is elevated; deteriorated by the installation of the electric heating module on the interior of the indoor unit, intense environment created may cause other components be burnt out or affect normal operation of air conditioner, more extremely increase the likelihood of causing an accident.

In order to avoid safety problems during the operation of electric heating module, a typical method adopted by the prior art comprises: determining whether an indoor fan of the air conditioner is working when the electric heating module needs to be turned on; prohibiting the electric heating module if the indoor fan is not working; that is to say the electric heating module is only working while the indoor fan is working.

The electric heating module is controlled by the above-mentioned method that the electric heating module is only working while the indoor fan operates, which could facilitate heat dissipation during the operation of the electric heating module so that safety hazards caused by high temperature inside the indoor unit could be prevented. However, the method still has some shortcomings: for example, if the indoor fan fails to start due to control logic errors and the like the electric heating module is still held from working; or if it fails to detect indoor unit working state, the electric heating module is also still held from working. Those circumstances lead to a problem that electric heating module could not be started as needed, so that the requirement for auxiliary heating could not be satisfied.

SUMMARY OF THE INVENTION

One aspect of the present invention is to provide an electric heating control method for air conditioner, and the other aspect of the present invention is to provide an electric heating control device. Both of them are used to guarantee a normal start of electric heating automatically to the greatest extent, so as to meet the requirement for auxiliary heating.

To achieve the above purpose of the present invention, technical solutions as follows are adopted.

An electric heating control method for air conditioner, wherein an indoor unit of air conditioner is provided with an electric heating module and an indoor fan; the electric heating module includes an electric heating unit and an electric heating control circuit; wherein the indoor unit is further provided with an auxiliary fan and the electric heating control method includes:

turning on the electric heating unit and the auxiliary fan when and electric heating start condition is satisfied, heat produced by the electric heating unit is dissipated from an air outlet of the indoor unit during the operation of the auxiliary fan.

Further after the electric heating unit and the auxiliary fan starting running a process is executed cyclically, and the process including:

obtaining a current running speed of the indoor fan and comparing the current running speed with a preset speed;

if the current running speed of the indoor fan is not less than the preset speed and the auxiliary fan is in operation, stopping the auxiliary fan;

if the current running speed is less than the preset speed and the auxiliary fan is not working, starting the auxiliary fan.

Further in the electric heating control method for air conditioner as described above, as the electric heating start condition being satisfied, the electric heating control circuit controls the operation of the electric heating unit and the auxiliary fan.

Preferably the auxiliary fan is arranged at a position close to the electric heating unit.

An electric heating control device for air conditioner, wherein an indoor unit of air conditioner is provided with an electric heating module and an indoor fan; the electric heating module includes an electric heating unit and an electric heating control circuit; wherein the indoor unit is further provided with an auxiliary fan and the electric heating control device further includes:

an auxiliary fan arranged in the indoor unit; and an electric heating main control unit at least configured to control the operation of the electric heating unit and the auxiliary fan as an electric heating start condition being satisfied;

heat produced by the electric heating unit is dissipated from an air outlet of the indoor unit during the operation of the auxiliary fan.

Further the electric heating control device for air conditioner as described above includes:

a current running speed obtaining unit configured to acquire a current running speed of the indoor fan; and a speed comparing unit configured to compare the current running speed with a preset speed, and to output a comparison result;

the electric heating main control unit is further configured to turn off the auxiliary fan in a working state if the comparison result output by the speed comparing unit shows that the current running speed of the indoor fan is not less than the preset speed; or to turn on the auxiliary fan in a turn-off state if the comparison result output by the speed comparing unit shows that the current running speed of the indoor fan is less than the preset speed.

Further the electric heating control device for air conditioner as described above wherein the electric heating control circuit is respectively connected to the electric heating unit and the auxiliary fan, and when the electric heating start condition is satisfied, the electric heating main control unit controls the electric heating control circuit, and controls the operation of the electric heating unit and the auxiliary fan through the electric heating control circuit.

Further the auxiliary fan is arranged at a position close to the electric heating unit.

In addition, the present invention also provides an air conditioner including the above-mentioned electric heating control device for air conditioner.

Beneficial Effect

Compared with the prior art, the advantages and positive effects of the present invention are: the electric heating control method for air conditioner and the control device provided by the present invention are equipped with an auxiliary fan; as the electric heating start condition being satisfied, the electric heating unit and the auxiliary fan are driven to start working, heat produced by the electric heating unit is dissipated through the air outlet of the indoor unit, and thereby lowering the risk caused by high temperature operation of electric heating; the arrangement of the auxiliary fan could ensure a safety operation of the electric heating unit even if the indoor fan fails to turn on; therefore, as long as the electric heating start condition is satisfied, the electric heating unit and the auxiliary fan are directly driven to start working no matter whether the indoor fan is running or whether a detection failure of the working state of the indoor fan is occurred; the arrangement could ensure a normal start of the electric heating to the greatest extent and meet the demand for auxiliary heating.

After reading the specific embodiments of the present invention in conjunction with the accompanying drawings, other features and advantages of the present invention will become clearer.

BRIEF DESCRIPTION OF THE DRAWINGS

In order to clearly explain the technical solutions disclosed by embodiments of the present invention, drawings to be used for illustrating the embodiments will be briefly introduced. Obviously, the drawings described in the following belong to a part of embodiments of the present invention. A person of ordinary skill in the art can obtain other drawings based on these drawings without creative work.

DETAILED DESCRIPTION OF THE EMBODIMENTS

In order to fully explain the objectives, technical solutions, and advantages of the present invention, the following will further describe the present invention in detail with reference to the accompanying drawings and embodiments.

Figure 1:
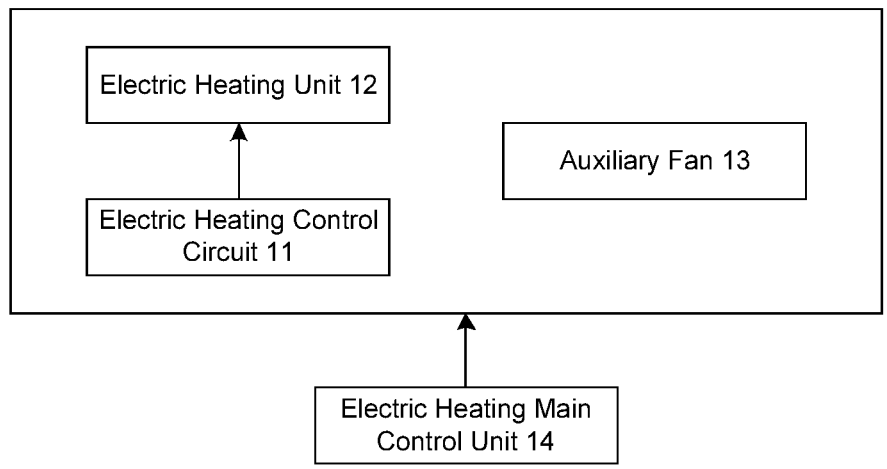
FIG. 1 is a block diagram of a first embodiment of an electric heating control device for air conditioner according to an aspect of the present invention.

FIG. 1 is a block diagram of a first embodiment of an electric heating control device for air conditioner according to an aspect of the present invention.

Referring to FIG. 1, an indoor unit of air conditioner disclosed by the first embodiment is provided with an electric heating module and an indoor fan (not shown in the Figures). The indoor unit further includes other components of a typical indoor unit such as a heat exchanger, and is also provided with an air inlet and an air outlet. Those traditional structures will not be specifically described and limited in the present embodiment. The indoor fan is configured to guide air around where the indoor unit is installed to flow into the indoor unit, circulate and then flow out to the ambient environment through the air outlet. The electric heating module is configured to provide an auxiliary heating source for air conditioner. The electric heating module includes an electric heating control circuit 11 and an electric heating unit 12, wherein the electric heating control circuit 11 is configured to control the turn-on or turn-off of the electric heating unit 12 and the electric heating unit 12 is an electric heating device such as electric tube heater or electric heat cable which produces heat once being powered on. Different from a typical air conditioner in the prior art, the electric heating control device disclosed by the present embodiment is provided with an auxiliary fan 13 and an electric heating main control unit 14; wherein the auxiliary fan 13 is arranged in the indoor unit and the electric heating main control unit 14 is at least configured to control the operation of both of the electric heating unit 12 and the auxiliary fan 13 when an electric heating start condition is satisfied, so as to dissipate heat produced during the operation of the electric heating unit 12 from the air outlet of the indoor unit by the operation of the auxiliary fan 13. The electric heating start condition is preset or known in the art, which could refer to the prior art and not limited in the present embodiment.

The auxiliary fan 13 could be installed in the indoor unit at a suitable position. As a preferred embodiment the auxiliary fan 13 is arranged close to the electric heating unit 12. With the arrangement, heat produced by the electric heating unit 12 could be quickly dissipated with the assistance of a relatively small volume of air, so that the risk caused by heat accumulated in the interior could be lowered and warm air could be brought to surroundings at once; moreover due to the fact that the auxiliary fan 13 is arranged close to the electric heating unit 12 and only a slight volume of air is required, small-scale fans could be selected and used as the auxiliary fan 13 which could avoid occupying too much space and enlarging the overall size of the indoor unit or interfering the installation of other components.

In the present embodiment the auxiliary fan 13 is provided in the indoor unit. As the electric heating start condition being satisfied, the electric heating unit 12 and the auxiliary fan 13 are driven to start working, heat produced by the electric heating unit 12 is dissipated through the air outlet of the indoor unit, and thereby lowering the risk caused by high temperature operation of electric heating. The arrangement of the auxiliary fan 13 could ensure a safety operation of the electric heating unit 12 even if the indoor fan fails to turn on. Therefore, as long as the electric heating start condition is satisfied, the electric heating unit 12 and the auxiliary fan 13 are directly driven to start working no matter whether the indoor fan is running or whether a detection failure of the working state of the indoor fan is occurred. The arrangement could ensure a normal start of the electric heating to the greatest extent and meet the demand for auxiliary heating.

Figure 2:
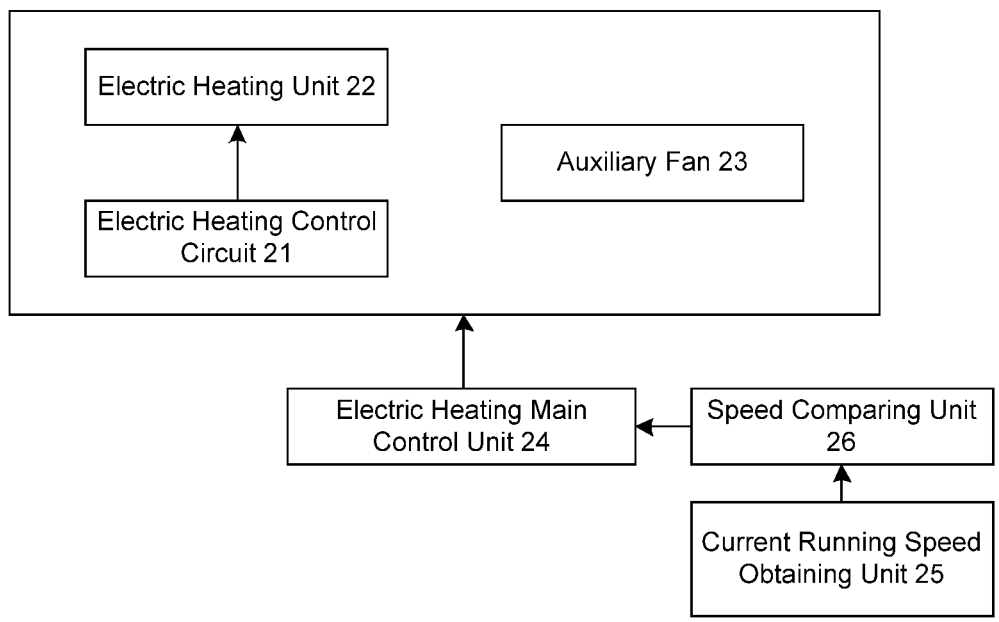
FIG. 2 is a block diagram of a second embodiment of an electric heating control device for air conditioner according to an aspect of the present invention.

FIG. 2 is a block diagram of a second embodiment of an electric heating control device for air conditioner according to an aspect of the present invention.

As shown in FIG. 2, an indoor unit of air conditioner disclosed by the second embodiment is provided with an electric heating module and an indoor fan. The indoor unit further includes other components of a typical indoor unit such as a heat exchanger, and is also provided with an air inlet and an air outlet. Those traditional structures will not specifically be described and limited in the present embodiment. The electric heating module includes an electric heating control circuit 21 and an electric heating unit 22. The electric heating control device disclosed by the present embodiment is provided with an auxiliary fan 23 and an electric heating main control unit 24; wherein the auxiliary fan 23 is arranged in the indoor unit and the electric heating main control unit 24 is at least configured to control the operation of both of the electric heating unit 22 and the auxiliary fan 23 when an electric heating start condition is satisfied, to dissipate heat produced during the operation of the electric heating unit 22 from the air outlet of the indoor unit by the operation of the auxiliary fan 23.

Different from the electric heating control device of the first embodiment shown in FIG. 1, the electric heating control device disclosed in the second embodiment further includes a current running speed obtaining unit 25 and a speed comparing unit 26; wherein the current running speed obtaining unit 25 is configured to acquire a current running speed of the indoor fan from control signals to the indoor fan sent by an air conditioner main controller or from feedback signals sent by a speed measurement unit provided on the indoor fan, and the speed comparing unit 26 is configured to compare the current running speed of the indoor fan obtained by the current running speed obtaining unit 25 with a preset speed and to output a comparison result. The preset speed is a preset or known speed value representing the operation state of the indoor fan. The electric heating main control unit 24 is further configured to turn off the auxiliary fan 23 in a working state if the comparison result output by the speed comparing unit 26 shows that the current running speed of the indoor fan is not less than the preset speed; or turn on the auxiliary fan 23 in a turn-off state if the comparison result output by the speed comparing unit 26 shows that the current running speed of the indoor fan is less than the preset speed.

Regarding the electric heating control device disclosed by the present embodiment, as the electric heating start condition being satisfied, both of the auxiliary fan 23 and the electric heating unit 22 are driven to start working by the electric heating main control unit 24 and then the electric heating main control unit 24 turns on or turns off the auxiliary fan 23 according to the current running speed of the indoor fan. If the current running speed of the indoor fan is greater than the preset speed, it means that the indoor fan is in a running state with a comparatively high speed and under this condition heat produced by the electric heating unit 22 could be dissipated at once and does not pose a risk to safety. The auxiliary fan 23 in the working state is stopped to manage its own energy consumption and noise produced, and moreover to reduce its own interference with normal air flow of air conditioner; in another aspect, if the current running speed of the indoor fan is less than the preset speed, it means that the indoor fan could be running with a comparatively low speed, or not working, which could be considered as a safety risk. Under this circumstance, if the auxiliary fan 23 is in a turn-off state, the auxiliary fan 23 is driven to start working so as to dissipate heat produced by the electric heating unit 22 by assistance of the operation of the auxiliary fan 23, thereby reducing safety risk caused by heat accumulation inside the interior, and further enabling the ambient environment to be heated in a short time.

Other technical effects could be achieved by the present embodiment refers to the first embodiment shown in FIG. 1.

Figure 3:
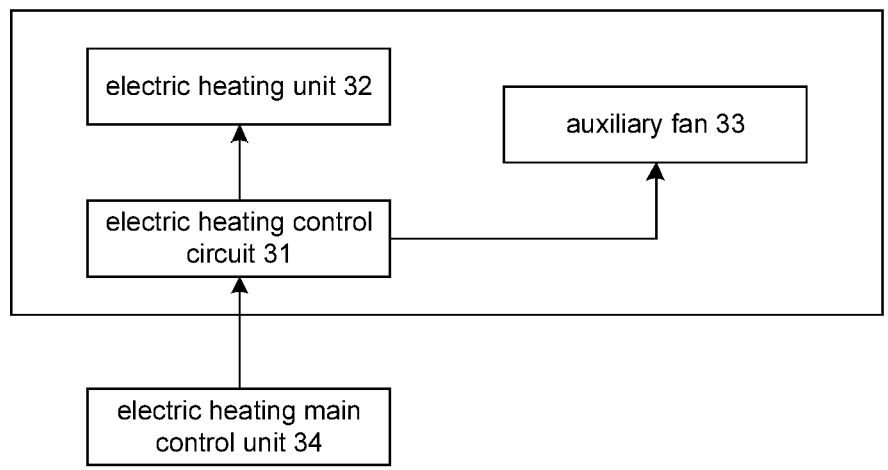
FIG. 3 is a block diagram of a third embodiment of an electric heating control device for air conditioner according to an aspect of the present invention.

FIG. 3 is a block diagram of a third embodiment of an electric heating control device for air conditioner according to an aspect of the present invention.

As shown in FIG. 3, an indoor unit of air conditioner disclosed by the third embodiment is provided with an electric heating module and an indoor fan. The indoor unit further includes other components of a typical indoor unit such as a heat exchanger, and is also provided with an air inlet and an air outlet. Those traditional structures will not specifically be described and limited in the present embodiment. The electric heating module includes an electric heating control circuit 31 and an electric heating unit 32. The electric heating control device disclosed by the present embodiment is provided with an auxiliary fan 33 and an electric heating main control unit 34; wherein the auxiliary fan 33 is arranged in the indoor unit and the electric heating main control unit 34 is at least configured to control the operation of both of the electric heating unit 32 and the auxiliary fan 33 when an electric heating start condition is satisfied, to dissipate heat produced during the operation of the electric heating unit 32 from the air outlet of the indoor unit by the operation of the auxiliary fan 33. More specifically, in the present embodiment, the electric heating control circuit 31 is respectively connected to the electric heating unit 32 and the auxiliary fan 33 with hardware. When the electric heating start condition is satisfied, the electric heating main control unit 34 controls the electric heating control circuit 31, and the electric heating control circuit 31 simultaneously controls the electric heating unit 32 and the auxiliary fan 33 to operate. Since the electric heating control circuit 31 simultaneously controls the electric heating unit 32 and the auxiliary fan 33 with hardware, the control of the auxiliary fan 33 by the electric heating control circuit 31 is realized. If the electric heating control circuit 31 controls the operation of the electric heating unit 32, the auxiliary fan 33 also operates synchronously; if the electric heating control circuit 31 controls the electric heating unit 32 to stop running, the auxiliary fan 33 also stops running. Therefore, it can ensure that when the electric heating unit 32 is started, the auxiliary fan 33 starts running at the same time, thereby improving the reliability of safe operation. Alternatively, if the electric heating unit 32 is turned off, the auxiliary fan 33 is turned off accordingly, thereby reducing energy consumption and noise caused by the auxiliary fan 33.

As a further improvement, a control circuit can be provided between the electric heating control circuit 31 and the auxiliary fan 33 to serve as a secondary control circuit of the auxiliary fan 33. The arrangement of this secondary control circuit provides a reasonable design with which the auxiliary fan 33 could be automatically stopped as the running speed of the indoor fan is comparatively high or could be automatically started again as the running speed of the indoor fan is comparatively low during the operation of the electric heating unit 32. As an example, the secondary control circuit could be a normally closed relay to achieve the above-mentioned functions.

Figure 4:
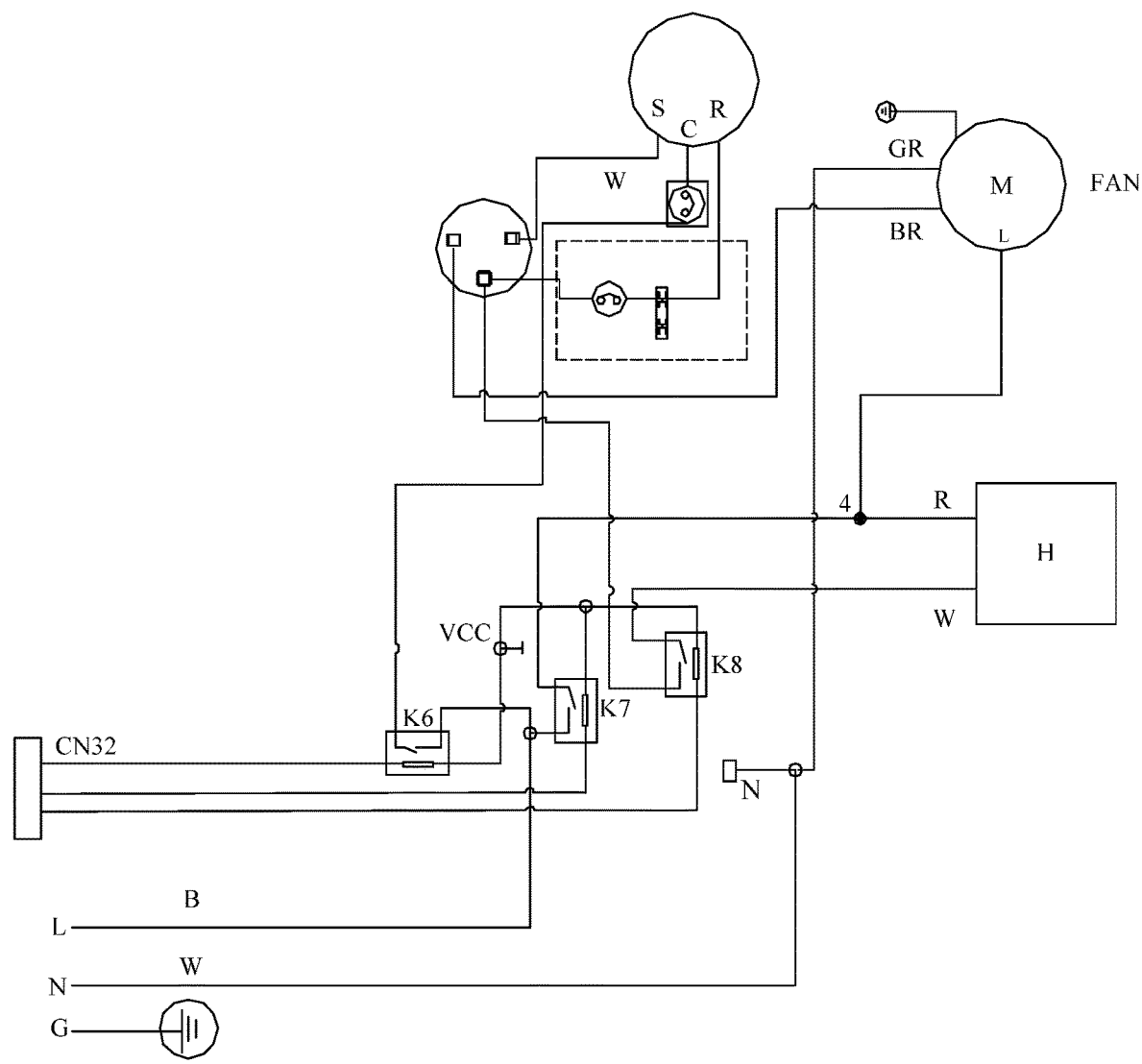
FIG. 4 is a schematic circuit diagram of the electric heating control device shown in FIG. 3.

FIG. 4 is a schematic circuit diagram of the electric heating control device shown in FIG. 3. As shown in FIG. 4, the electric heating control circuit 31 includes a relay K7. One end of a normally open contact of the relay K7 is respectively connected to a tube heater H and the auxiliary fan FAN. If the electric heating is not required, a coil of the relay K7 loses power which is controlled by the electric heating main control unit and the normally open contact of the relay K7 is disconnected, both of the power supply of the tube heater H and the auxiliary fan FAN are disconnected and neither of them works. When the electric heating start condition is satisfied, the coil of the relay K7 is energized which is controlled by the electric heating main control unit and the normally open contact of the relay K7 is closed, both of the power supply of the tube heater H and the auxiliary fan FAN are powered and driven to start work. Therefore, from a perspective of hardware design, it is realized that the auxiliary fan FAN is started as the electric tube heater H is started, thereby avoiding a situation that the auxiliary fan FAN could not able to normally start due to software error occurred in the electric heating main control unit, further improving the safety of electric heating control.

Those electric heating control devices disclosed in the embodiments described above could be applied to an air conditioner, which are beneficial to improving the operation performance of the air conditioner, especially the operation safety.

On the basis of the embodiments of the air conditioner electric heating control device shown in FIG. 1 to FIG. 4, another aspect of the present invention is to provide an air conditioner electric heating control method. Specifically an indoor unit of the air conditioner is provided with an electric heating module and an indoor fan, wherein the electric heating module includes an electric heating unit and an electric heating control circuit. The indoor unit is further provided with an auxiliary fan. The air conditioner electric heating control method comprises: starting the electric heating unit and the auxiliary fan when an electric heating start condition is met; heat produced by the electric heating unit is dissipated from an air outlet of the indoor unit during the operation of the auxiliary fan.

As a preferred embodiment, the auxiliary fan is arranged close to the electric heating unit. Moreover, when the electric heating start condition is satisfied, it is preferable to control the operation of the electric heating unit and the auxiliary fan by means of the electric heating control circuit.

The principles and technical effects of the above electric heating control method and its preferable embodiments could refer to the descriptions of the electric heating control devices mentioned above correspondingly.

Figure 5:
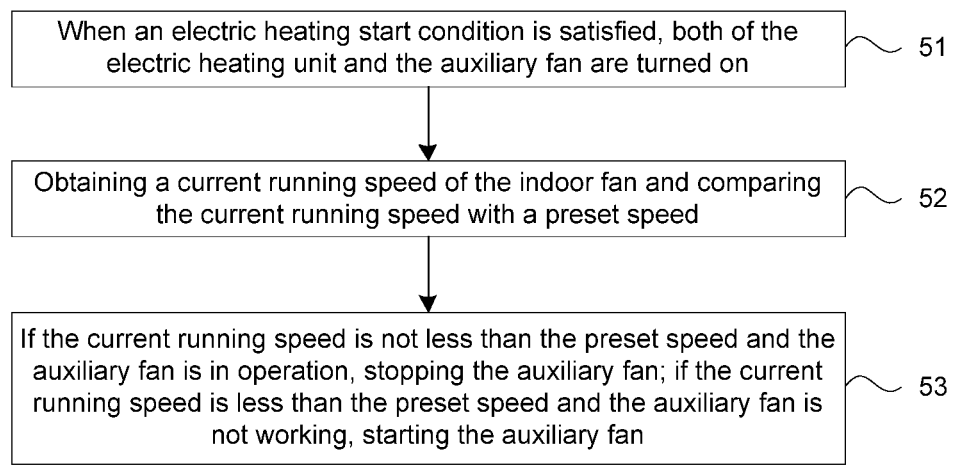
FIG. 5 is a flow chart of an embodiment of an electric heating control method for air conditioner according to another aspect of the present invention.

FIG. 5 is a flowchart of an electric heating control method for air conditioner disclosed by the present invention, specifically, is a flowchart of an electric heating control method corresponds to the electric heating control device as shown in FIG. 2.

Referring to FIG. 5, the electric heating control method for air conditioner includes a process as follows.

Step 51: when an electric heating start condition is satisfied, both of the electric heating unit and the auxiliary fan are operated.

The electric heating start condition is preset or known in the art and the specific condition could refer to the prior art, which is not limited in the present embodiment. When the electric heating start condition is satisfied, an electric heating main control unit drives the electric heating unit and the auxiliary fan to run; then heat produced by the operation of the electric heating unit is dissipated from the air outlet of the indoor unit during the operation of the auxiliary fan, thereby avoiding potential safety hazards posed by high-temperature operation of electric heating.

Accordingly, the safe operation of the electric heating unit could be guaranteed during the operation of the auxiliary fan even if the indoor fan is not properly started. With those arrangements, no matter whether the indoor fan is running or whether the working state of the indoor fan is accurately detected, the electric heating unit and the auxiliary fan are automatically started, so as to ensure the normal operation of the electric heating to the greatest extent and meet the demand for auxiliary heating by electric heating.

After the electric heating unit and the auxiliary fan are running, the following steps 52 and 53 are executed cyclically.

Step 52: obtaining a current running speed of the indoor fan and comparing the current running speed with a preset speed.

The current running speed of the indoor fan could be obtained from control signals to the indoor fan sent by an air conditioner main controller or from feedback signals sent by a speed measurement unit provided on the indoor fan. The preset speed is a preset or known speed value representing the operation state of the indoor fan.

Step 53: If the current running speed is not less than the preset speed and the auxiliary fan is in operation, stopping the auxiliary fan; if the current running speed is less than the preset speed and the auxiliary fan is not working, starting the auxiliary fan.

If the current running speed of the indoor fan is greater than the preset speed, it means that the indoor fan is in a running state with a comparatively high speed and under this condition heat produced by the electric heating unit could be dissipated at once and does not pose a risk to safety. The auxiliary fan in the working state is stopped to manage its own energy consumption and noise produced, and moreover to reduce its own interference with normal air flow of air conditioner; in another aspect, if the current running speed of the indoor fan is less than the preset speed, it means that the indoor fan could be running with a comparatively low speed, or not working, which could be considered as a safety risk. Under this circumstance, if the auxiliary fan is in a turn-off state, the auxiliary fan is driven to start working so as to dissipate heat produced by the electric heating unit by assistance of the operation of the auxiliary fan, thereby reducing safety risk caused by heat accumulation inside the interior, and further enabling the ambient environment to be heated in a short time.

The above embodiments are only used to illustrate the technical solutions of the present invention, but not to limit them; although the present invention has been described in detail with reference to the foregoing embodiments, for those of ordinary skill in the art, the technical solutions of the foregoing embodiments can still be described. The recorded technical solutions are modified, or some of the technical features are equivalently replaced; these modifications or replacements do not cause the essence of the corresponding technical solutions to deviate from the spirit and scope of the technical solutions claimed by the present invention.

The invention claimed is:

1. An electric heating control method for air conditioner, wherein an indoor unit of air conditioner is provided with an electric heating module and an indoor fan; the electric heating module includes an electric heating unit and an electric heating control circuit; wherein the indoor unit is further provided with an auxiliary fan and the electric heating control method comprises:
   turning on the electric heating unit and the auxiliary fan when electric heating start condition is satisfied,
   dissipating heat produced by the electric heating unit from an air outlet of the indoor unit during the operation of the auxiliary fan,
   executing following process cyclically after the electric heating unit and the auxiliary fan starting running:

obtaining a current running speed of the indoor fan and comparing the current running speed with a preset speed;

stopping the auxiliary fan when the current running speed of the indoor fan is not less than the preset speed and the auxiliary fan is in operation;

starting the auxiliary fan when the current running speed is less than the preset speed and the auxiliary fan is not working;

wherein as the electric heating start condition being satisfied, the electric heating control circuit controls the operation of the electric heating unit and the auxiliary fan, and wherein the auxiliary fan is arranged at a position close to the electric heating unit.

2. An electric heating control device for air conditioner, wherein an indoor unit of air conditioner is provided with an electric heating module and an indoor fan;

the electric heating module includes an electric heating unit and an electric heating control circuit;

wherein the indoor unit is further provided with an auxiliary fan, and the electric heating control device further comprises:

an auxiliary fan arranged in the indoor unit; and an electric heating main control unit at least configured to control the operation of the electric heating unit and the auxiliary fan as an electric heating start condition being satisfied;

heat produced by the electric heating unit is dissipated from an air outlet of the indoor unit during the operation of the auxiliary fan;

a current running speed obtaining unit configured to acquire a current running speed of the indoor fan; and a speed comparing unit configured to compare the current running speed with a preset speed, and to output a comparison result;

the electric heating main control unit is further configured to turn off the auxiliary fan in a working state if the comparison result output by the speed comparing unit shows that the current running speed of the indoor fan is not less than the preset speed; or to turn on the auxiliary fan in a turn-off state if the comparison result output by the speed comparing unit shows that the current running speed of the indoor fan is less than the preset speed;

wherein the electric heating control circuit is respectively connected to the electric heating unit and the auxiliary fan, and when the electric heating start condition is satisfied, the electric heating main control unit controls the electric heating control circuit, and controls the operation of the electric heating unit and the auxiliary fan through the electric heating control circuit;

wherein the auxiliary fan is arranged at a position close to the electric heating unit.

3. An air conditioner, wherein the air conditioner comprises the electric heating control device for air conditioner according to claim 2.

* * * * *